United States Patent [19]

Mann

[11] 4,428,122
[45] Jan. 31, 1984

[54] ROTARY TARGET V-BLOCK

[75] Inventor: Charlton W. Mann, Yorktown, Va.

[73] Assignee: The United States of America as represented by the Administrator of the National Aeronautics and Space Administration, Washington, D.C.

[21] Appl. No.: 352,831

[22] Filed: Feb. 26, 1982

Related U.S. Application Data

[63] Continuation of Ser. No. 30,964, Apr. 17, 1979, abandoned.

[51] Int. Cl.³ .................. G01B 11/30; G01C 15/00
[52] U.S. Cl. .................................................. 33/293
[58] Field of Search ............... 33/292, 293, 295, 296, 33/290, 1 H, 286, 287, 412

[56] References Cited

U.S. PATENT DOCUMENTS

| | | | |
|---|---|---|---|
| 2,169,533 | 8/1939 | Kasten | 33/412 X |
| 2,565,382 | 8/1951 | Lemaire | 33/287 |
| 2,647,733 | 4/1949 | Ehrenberg | 33/293 |
| 2,840,913 | 7/1958 | Houser | 33/295 |
| 3,080,656 | 3/1963 | Olliff | 33/287 X |
| 3,107,168 | 10/1963 | Hogan et al. | 33/287 |
| 4,003,133 | 1/1977 | Pierik | 33/286 |
| 4,085,512 | 4/1978 | Bod et al. | 33/293 |
| 4,128,945 | 12/1978 | Barritt | 33/DIG. 1 X |

FOREIGN PATENT DOCUMENTS

| | | | |
|---|---|---|---|
| 244614 | 3/1912 | Fed. Rep. of Germany | 33/287 |
| 975059 | 10/1950 | France | 33/287 |
| 6055 | of 1903 | United Kingdom | 33/178 R |

Primary Examiner—Harry N. Haroian
Attorney, Agent, or Firm—Howard J. Osborn; John R. Manning

[57] ABSTRACT

A device is disclosed for measuring the distance from a reference plane to a flat or cylindrical surface. The device contains a rotatable measuring scale which is sited with a optical instrument to make the measurement. Readings are taken at various points along the surface to establish an elevation curve which is used to align the surface with the reference plane.

6 Claims, 4 Drawing Figures

FIG. 3
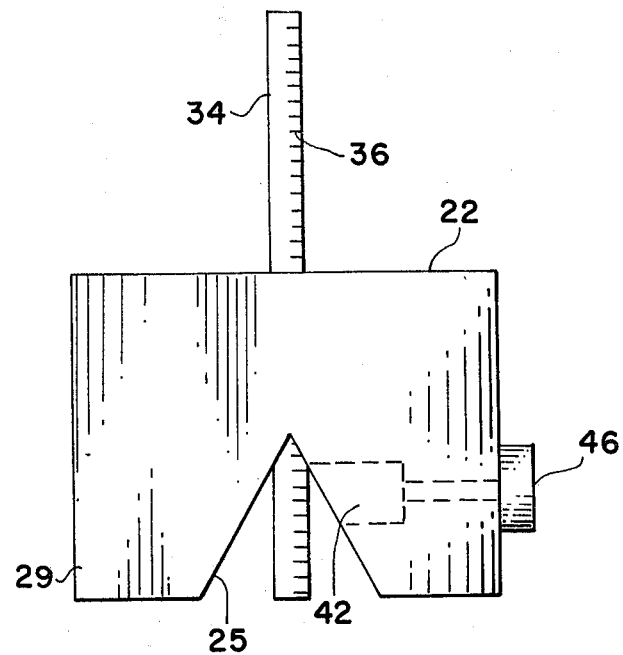
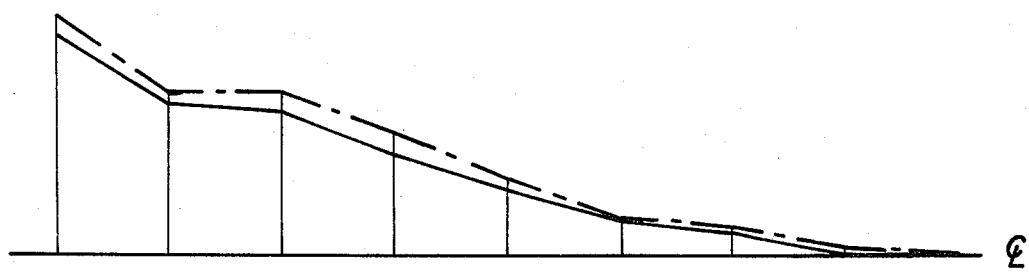
FIG. 4

ROTARY TARGET V-BLOCK

ORIGIN OF THE INVENTION

The invention herein described was made by an employee of the United States Government and may be manufactured and used by or for the Government for governmental purposes without the payment of any royalties thereon or therefor.

This is a continuation, of application Ser. No. 030,964, filed Apr. 17, 1979 now abandoned.

FIELD OF THE INVENTION

This invention relates to a device used in the optical alignment of machinery and more particularly to a device that maintains a measuring scale in the proper position for optical readings to be taken. The device has been used to align electric motors and fans that use a common shaft in a wind tunnel.

PRIOR ART OF THE INVENTION

A wind tunnel may contain various pieces of machinery connected to a common shaft, for example fans and electric motors. It is important to maintain the shaft and the pieces of machinery in precise alignment with each other. Incorrect alignment can lead to costly breakdowns due to uneven stresses placed upon the machinery pieces.

In the optical alignment of machinery a measuring scale is placed in a vertical position upon the object to be aligned. An optical instrument containing a crosshair in the viewfinder is directed toward the scale to take a reading. By looking through the eyepiece of the optical instrument the distance between an arbitrary reference plane and the object can be read off the scale. The scale is moved to different locations on the object and further readings are taken from which an elevation curve is drawn. Adjustments in the position of the object are made, according to the elevation curve, to correct the alignment thereof.

The present method of optically aligning machinery requires someone to hold the scale and someone else to take the readings. Frequently a block will be placed on the machinery being aligned against which the scale will be held to add stability to the scale. There are several basic disadvantages to this procedure. Firstly, two people are required to take an optical reading. Secondly, it introduces inaccuracies due to the difficulty in holding the scale vertically and the uncertainty of where the scale contacts the machinery. And thirdly, if the scale is held against a block it may be impossible to take a reading since machinery may obstruct the line of sight of the optical instrument and the scale cannot be rotated to face a different direction.

SUMMARY OF THE INVENTION

In the present invention a block containing a notch in the shape of an inverted v is used to check the alignment of machinery. The notch allows the block to be placed on flat or curved surfaces.

The block contains a level indicator to enable the operator to position it correctly on the surface being aligned.

A weighted measuring scale is inserted through a rotatable plug positioned over the centerline of the inverted v. The weight of the scale holds it in contact with the surface of the machinery being aligned. The scale and plug combination can be rotated so that the scale faces an optical aligning instrument. The optical aligning instrument is then used, in conjunction with the scale, to measure the distance of the machinery from a reference plane.

An alternate embodiment discloses a device as above but made of ferrous material and containing a magnetic device. The magnetic device is of the type well known in the art in which the lines of force of a permanent magnet can be directed to cause the magnet to adhere or not adhere to a ferromagnetic surface. This type of magnetic device is described in U.S. Pat. No. 2,337,248 which was granted to S. Koller. Hereinafter it will be referred to as a switched magnet.

The V-block with switched magnet may be placed on a flat or curved surface at any angle. The magnet is turned on to hold the block in position against the machinery while measurements are taken.

Accordingly it is an object of the present invention to provide a convenient, easy to use, accurate alignment device.

A further object of the present invention is to provide an alignment device that requires only one man for its use.

An additional object of the present invention is to provide an alignment device that ensures proper positioning of the measuring scale, thereby reducing measurement error.

Another object of the present invention is to provide an alignment device that ensures constant contact between the base of the scale and the object being aligned thereby reducing measurement error.

A further object of the present invention is to provide an alignment device that can be used on flat and round surfaces of any diameter.

An additional object of the present invention is to provide an alignment device with a measuring scale that can be positioned to face any direction.

Another object of the present invention is to provide an alignment device that can ensure that the centerline of the measuring scale is aligned along the plumbline of the object being aligned.

A further object of the present invention is to provide an alignment device that can be used with scales of varying lengths.

Another object of the present invention is to provide an alignment device that can be used with scales of different sizes and configurations.

Another object of the present invention is to provide an alignment device that can be placed on and will adhere to flat or curved surfaces at any angle.

Another object of the present invention is to provide an alignment device that can be used with a decrease in the set up time.

BRIEF DESCRIPTION OF THE DRAWINGS

FIG. 3 is an elevational view of an embodiment of the invention containing a switched magnet.

FIG. 4 is a graph of the elevation curve.

DETAILED DESCRIPTION OF THE DRAWINGS

Figure 1:
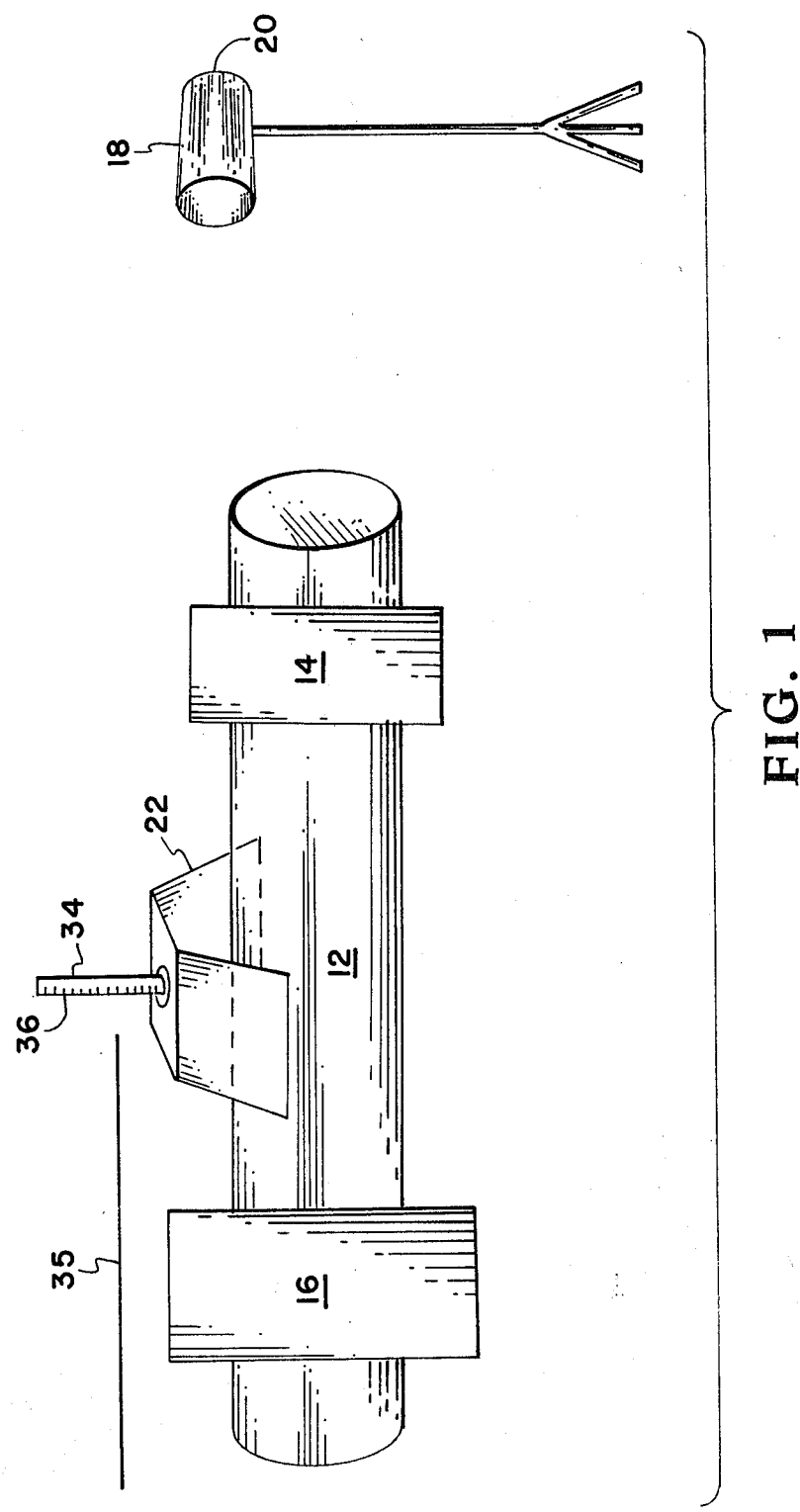
FIG. 1 is an elevational view demonstrating the use of the invention on a curved surface.

The invention can be understood easily by referring to the drawings in which like numbers indicate identical components of the device.

FIG. 1 illustrates equipment with which the invention may be utilized and the normal manner alignment apparatus would be associated therewith. For example, the invention may be used with equipment found in a wind tunnel to drive a plurality of fans 14 by means of shaft 12. Shaft 12 is driven by a plurality of electric motors 16.

The invention consists of a modified V-block 22 which rests on shaft 12. Projecting from the block 22 is a scale 34 which contains markings 36 evenly spaced along the scale's length. Optical instrument 18, such as a surveyors transit, is positioned so viewfinder 20 faces scale 34. Viewfinder 20 contains a crosshair to facilitate an accurate reading of the markings 36 on scale 34.

Reference plane 35 may be any stationary object containing a horizontal surface or, as in FIG. 1, a line painted on the wall at an arbitrary height.

Figure 2:
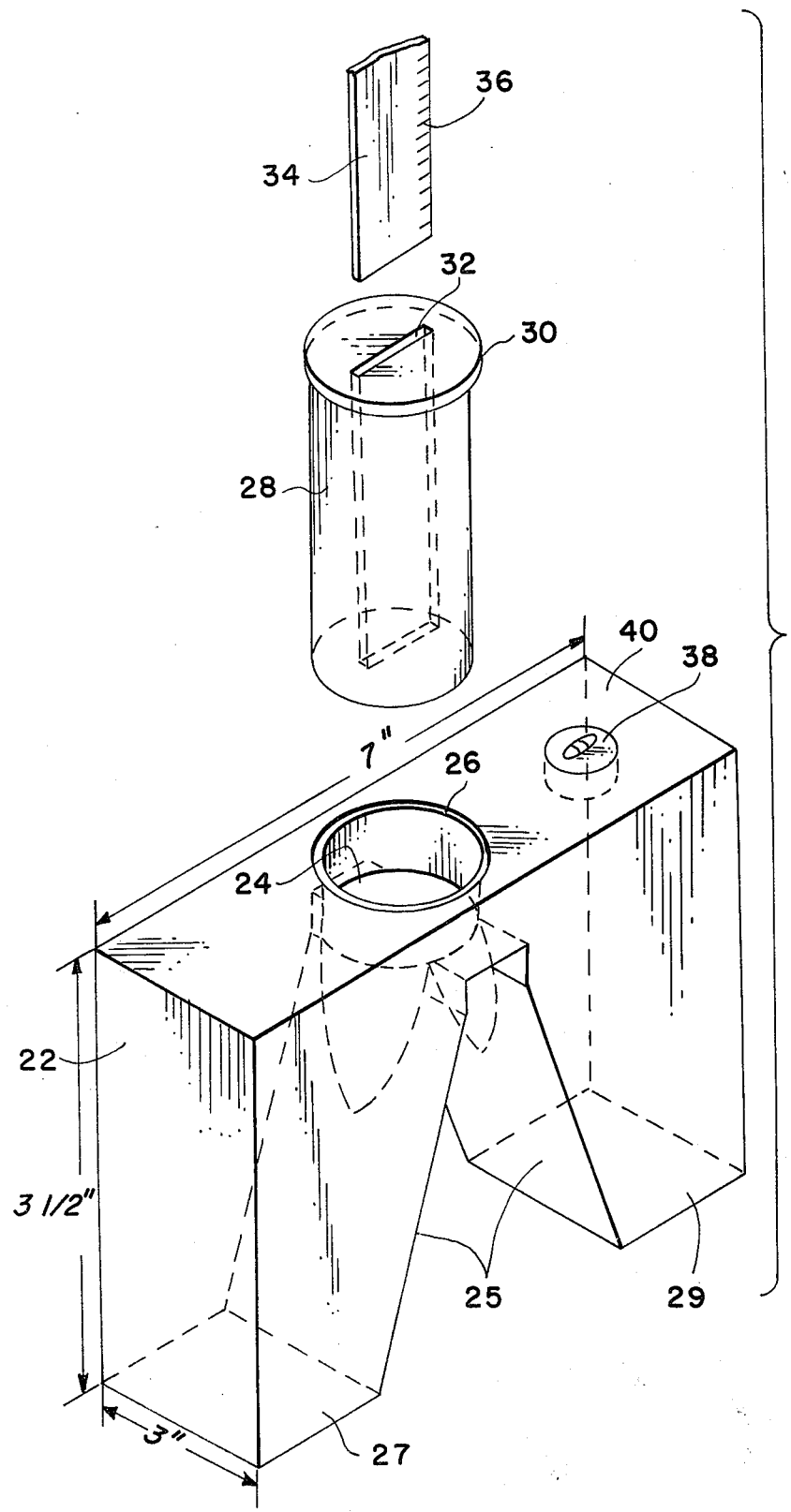
FIG. 2 is an exploded isometric view of the invention.

As best seen in FIG. 2 the invention comprises a block 22 with legs 27 and 29 forming a 45 degree notch 25 in the shape of an inverted "v".

A block constructed by the invention is 7 in. long (A—A in FIG. 2), 3½ in. high (B—B), and 3 in. wide (C—C). This block can be used on shafts measuring from 1 in. to 2 ft. in diameter. It should be noted that V-blocks can be constructed of varying sizes and the aforementioned dimensions are not intended to restrict the invention.

V-block 22 contains a central aperature 24. The top surface 40 of the block immediately surrounding the aperture 24 is slightly recessed 26. A flanged cylindrical plug 28 is inserted into the aperture, the flange 30 contacts the recessed surface 26 of the block which supports the plug and allows its rotation within the block.

Plug 28 contains a slot 32 into which a weighted measuring scale 34 is inserted. Scale 34 contains markings 36 evenly spaced along its length. The markings 36 indicate distances along the scale. A K and E pared scale, as is well known in the art, can be used for scale 34.

The V-block 22 also contains a level indicator 38 on its upper surface 40. The indicator may be of the conventional liquid bubble type, well known in the art.

An alternate embodiment employs a switched permanent magnet 42 within on of the legs 29 of the V-block 22 as displayed in FIG. 3. The V-block in this embodiment, is constructed of ferrous material. A knob 46 on the side of the V-block is used to change the alignment of the magnetic field. The design of a switched magnet is well known in the art and will not be herein discussed.

OPERATION OF THE INVENTION

Referring to FIG. 1, the V-block 22 is placed upon the surface to be aligned which may be, as shown in the figure, a cylindrical shaft 12 used in a wind tunnel. The V-shape allows the block to rest securely upon shafts of varying diameter. The V-block 22 is positioned so that its upper surface 40 is horizontal by observing the bubble in the level indicator 38.

Once the V-block 22 is positioned correctly on the shaft 12 scale 34 is inserted through the rotatable plug 28 until it contacts the surface of the shaft 12. The weight of the scale 34 ensures that it maintains contact with the surface of shaft 12. The scale is then rotated with plug 28 until it faces the optical aligning instrument 18. The distance between the horizontal reference plane 35 and the surface 12 can then be ascertained by peering through the optical instrument at the scale. This measurement is recorded and the device is moved to other locations on the surface 12 and further readings are taken and recorded.

The measurements are used to establish an elevation curve which is displayed in FIG. 4. Finally adjustments are made in the position of the surface, by referencing the elevation curve, in order to put the surface in the desired aligned position.

The alternate embodiment operates in the same manner except that it can be used to align a device with any reference plane; it is not limited to horizontal reference planes. The V-block 22 is placed against the surface 12 such that the measuring scale 34 is perpendicular to the reference plane. The knob 46 is turned so that the magnet 42 causes the V-block 22 to adhere to the surface 12. After the reading is taken the block may be removed by turning the knob 46.

What is claimed as new and desired to be secured by Letters Patent of the United States is:

1. An alignment device comprising:
   an elongated member to be aligned having a surface thereon;
   holder means adapted to be placed at any position along said elongated member to be aligned;
   said holder means being a V-block having a hole therethrough at the apex thereof the top of said hole containing a recessed lip;
   means for determining and establishing a reference plane;
   target means supported by said V-block movable with respect thereto enabling siting from any angle;
   said target means being a scale carried by a rotatable plug;
   said rotatable plug positioned by the recessed lip within the hole of said V-block such that said plug may rotate while within said hole; and
   means for siting said target means supported by said holder means at various positions along said elongated member to determine the variations of the elongated member to be aligned from said reference plane.

2. A device as in claim 1 wherein said rotatable plug has a through aperture receiving said scale slidable therein such that said scale contacts said surface of said elongated member to be aligned.

3. A device as in claim 2 wherein said plug and said scale are positioned coaxially within and rotate about the vertical centerline of said V-block, said plug supporting said scale such that the axis of said scale maintains vertical alignment with a plumbline of the surface of said elongated member to be aligned.

4. A device as in claim 3 wherein a level indicator is carried by said V-block to center said V-block on said elongated member to be aligned.

5. A device as in claim 1 wherein said V-block is made of ferrous material and contains means for selective magnetization to enable said V-block to adhere at any angle to a ferromagnetic elongated member to be aligned.

6. A device as in claim 2 wherein said scale is weighted to assure contact thereof with the surface of said elongated member to be aligned.

* * * * *